United States Patent [19]

Guttmann

[11] 4,036,612

[45] July 19, 1977

[54] APPARATUS FOR SEPARATING PARTICLES FROM A GAS STREAM

[75] Inventor: Friedrich-Wilhelm Guttmann, Bensberg-Refrath, Germany

[73] Assignee: Klockner-Humboldt-Deutz Aktiengesellschaft, Germany

[21] Appl. No.: 686,726

[22] Filed: May 17, 1976

[30] Foreign Application Priority Data

May 17, 1975 Germany .............................. 2522097

[51] Int. Cl.² .............................................. B01D 45/08
[52] U.S. Cl. .................................... 55/282; 55/423; 55/431; 55/445; 55/466
[58] Field of Search ................. 55/218, 261, 266, 282, 55/301, 302, 397, 398, 423, 431, 442, 443, 445, 466, 484

[56] References Cited

U.S. PATENT DOCUMENTS 1,482,850  2/1924  Kling ........................................ 55/423

FOREIGN PATENT DOCUMENTS

| 48,993 | 10/1938 | France ........................................ 55/423 |
| 505,932 | 9/1927 | Germany ...................................... 55/443 |
| 712,542 | 7/1954 | United Kingdom ..................... 55/431 |

Primary Examiner—Frank W. Lutter
Assistant Examiner—David L. Lacey
Attorney, Agent, or Firm—Hill, Gross, Simpson, Van Santen, Steadman, Chiara & Simpson

[57] ABSTRACT

Apparatus for separating solid substances from a stream of gas employing vertical deflecting plates extending parallel to one another but arranged inclined to the direction of gas flow. The deflecting plates are provided with open collecting grooves and with a fluidizing layer of gas on the outer surfaces thereof.

4 Claims, 4 Drawing Figures

APPARATUS FOR SEPARATING PARTICLES FROM A GAS STREAM

BACKGROUND OF THE INVENTION

In known apparatus for the separation of solid substances from a stream of gas, there has been a problem with the formation of deposits of particles on the surfaces of deflecting plates and in the collection grooves formed therein. Particles of material present in the stream of a crude gas being purified tend to adhere to the surfaces associated with the deflecting plates. Such a particle deposition is disadvantageous to particle separation. The prior art apparatus must, therefore, from time to time be taken out of services in order to free the deflecting plates and the collecting grooves arranged in end areas thereof from formations of deposited particles. Such procedure, however, is connected with great expenditures of work, time, and costs.

SUMMARY OF THE INVENTION

The present invention relates to an apparatus and technique for the separation of solid substances from a stream of gas. The invention utilizes deflecting plates extending parallel to one another with the plates inclined to the direction of gas flow. The deflecting plates are provided with open collecting grooves and with means for providing a layer of fluidizing gas on outer surfaces thereof.

An object of the invention involves the provision of suitable measures through which deposits on the deflecting plate surfaces in such particle separation apparatus are avoided or substantially prevented. This object is achieved by having the deflecting plates and/or the collection grooves thereof provided with openings therethrough which are in connection with at least one pressure chamber or cavity arranged on a side facing away from the direction of gas flow. Gas under a higher pressure from that from which the solid substances are being separated is forced through openings in the deflecting plates. By means of such measures, according to this invention, a fluidizing layer of gas is creased directly on the outer surface portions of the deflecting plates.

The fluidizing layer of gas moves in a direction which is towards the collection grooves arranged on end areas of the deflecting plates. Solid substances present in the stream of crude gas, in the operation of the apparatus of this invention, are in effect centrifuged against outer surface portions of the deflecting plates and enter the fluidizing layer of gas flowing over the outer surfaces of the plates. The solid substances are discharged from the plate surfaces directly into the collecting grooves arranged at the end of each deflecting plate. From here they are conveyed off and downwardly out of the apparatus.

The height or thickness of a layer of gas flowing on the surface of a deflecting plate may be controlled in a simple manner through a change in pressure of the gas media in the pressure cavity behind a deflecting plate, such a change of pressure being associated with a corresponding change in the speed of gas flow from such cavity through openings in each deflecting plate. In order to prevent solids from passing through the gas flow apertures in each deflecting plate, naturally the gas media in each cavity is pressed outwardly under a higher pressure through the gas flow apertures than the pressures of the crude gas flowing over the surfaces of the deflecting plates. The outer surfaces of the collection grooves are in this general manner reliably protected from the formations of deposits of particles as solid particles leaving the stream of crude gas are held in a continuous movement over the deflecting plates and through the channels as provided herein.

Further objects, features, details, advantages and purposes and the like associated with the present invention will become apparent to those skilled in the art from the following description taken with the drawings.

DETAILED DESCRIPTION

Figure 1:
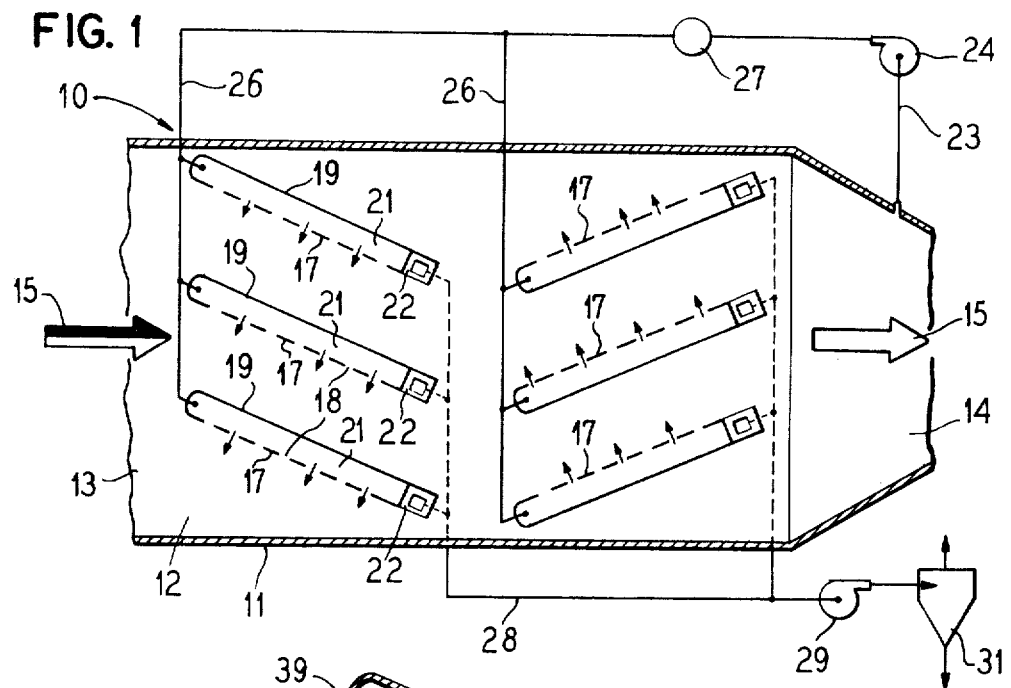
FIG. 1 illustrates a plan view of one embodiment of apparatus of the present invention for separating solid substances from a gas stream with deflecting plates vertically arranged and inclined to the direction of gas flow, a top portion of such apparatus having been removed, some portions of this figure being shown in schematic form.

Referring to FIG. 1, there is seen one embodiment of apparatus of this invention herein designated in its entirety by the numeral 10. Apparatus 10 employs a housing 11 which has formed therein a chamber 12. Chamber 12 has a gas input port 13 defined in one end region thereof and a gas output port 14 defined in an opposed end region thereof for passage of a gas stream longitudinally through chamber 12 as suggested by arrows 15 and 16.

A plurality of spaced, parallel deflecting plates 17 are located in the chamber 12. In apparatus 10, the plates 17 are arranged into two rows in longitudinally spaced adjacent relationship to one another. Plates 17 extend generally transversely across the direction of flow of the gas stream through chamber 12. The front face of each deflecting plate 17 is inclined to the direction of flow.

Each deflecting plate 17 is provided with a plurality of small gas flow apertures 18 distributed over its entire surface.

Each deflecting plate 17 is provided with wall members 19 which define in combination with each deflecting plate 17 a relatively small shell or cavity 21 over and above the rear face of each deflecting plate 17. These wall members 19 further define a transversely extending channel 22 along the terminal edge portion of each deflecting plate 17 relative to the direction of flow of gas through chamber 12. The mouth of each channel 22 is in generally parallel relationship to its adjacent deflecting plate 17.

Each cavity 21 serves as a pressure chamber through which a gaseous medium under a higher pressure than the pressure of the gas stream in chamber 12 so that the gaseous medium can escape through apertures 18.

As a gaseous medium to be expelled from cavities 21 any convenient substance can be employed, preferences being either a foreign gas which does not influence the gas stream flowing through the chamber 12 or a gas of the same composition as that flowing through chamber 12 which has already been subjected to the particle removing procedures and technique provided by the apparatus of the present invention. To utilize as the gaseous medium such a purified gas, one need only have a connecting conduit 23 associated with the region of the gas output port 14 of housing 11. Conduit 23 is then associated with a compressor 24, and from conduit 23 individual conduits 26, which interconnect with one another, are provided for interconnection with individual ones of the cavities 21.

The pressure to be maintained in the cavities 21 which is higher than the crude gas flow pressures existing in chamber 12 generally can be regulated or adjusted by a gas flow meter 27 or the like so as to adjust the gas pressure in cavities 21 according to the type and nature of the solid substances to be separated, the gas flow rate and pressures in chamber 12, and the like.

Particles separated from the crude gas and collected in the channel 22 are discharged from same and are conveyed off downwardly out of the apparatus 10 by, for example, a conduit 28 which interconnects with the channels 22 and their respective bottom ends. Conduit 28 may be connected with a compressor 29 whose output feeds a cyclone 31. Any conventional means for separating and processing particles collected from the channels 22 may be employed as those skilled in the art will appreciate.

In accordance with the particular advantage obtained by the construction and arrangement of the deflecting plates according to this invention is that the particles of solid material or the like removed or centrifuged out of the stream of crude gas flowing through chamber 11 against the inclined front faces of deflecting plates 17 are grasped by the gas flow layer existing on the surface of the deflecting plates 17. Such gas flow layer discharges the particles into the collecting groove 22 associated with each plate 17 so that no deposits of solids on the surfaces of the deflecting plates occurs.

Care should be taken in this connection so that the solid particles taken up and swept along by the gas flow layer after leaving the stream of crude gas are not pulled along out of the stream of gas existing in the collecting channels 22. In order to prevent such an effect, as has been indicated previously, influence may be had on the gas flow layer through change of the pressure of the gaseous media in the chambers or cavities 21. In order to prevent an overflowing of solid particles of material out from individual collection grooves 22, it may be advantageous to permit the gas flow layer on each plate 17 to flow pulsatingly or intermittently.

Figure 2:
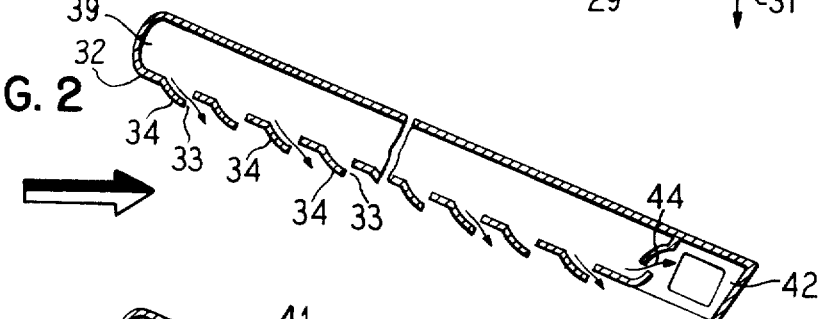
FIG. 2 shows a plan view of one embodiment of a deflecting plate construction of the present invention, an end portion thereof having been removed.

In FIG. 2, a deflecting plate 32 is provided with seam-like openings 33. The openings 33 are formed by means of outwardly directed seams 34.

Figure 3:
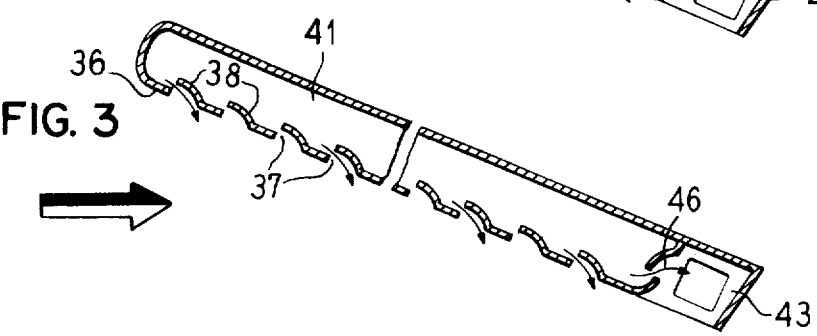
FIG. 3 is a view similar to but showing an alternative embodiment.

In FIG. 3, a deflecting plate 36 is likewise provided with seam-like openings 37 which are formed by means of inwardly opening seams 38.

In the embodiments as shown in FIGS. 2 and 3, it is essential that the seam-like openings in the deflecting plates be so arranged that gaseous media issuing out of the respective chambers 39 and 41 through the openings 33 and 37 not reach outwardly against, but extend approximately in the direction of anticipated flow of crude gas moving through a chamber such as chamber 12 in an assembled apparatus. Also, by means of such seam-like construction of the openings in deflecting plates, according to this invention, the surface of the deflecting plate is kept free from adhering solid particles.

Furthermore, it may in this connection also be of advantage if the walls of the deflecting plate facing or adjacent a collector groove such as grooves 42 and 43 respectively are provided with seam-like openings 44 and 46 respectively in order thereby to accelerate the removal of solid particles collecting in such grooves 42 and 43.

Figure 4:
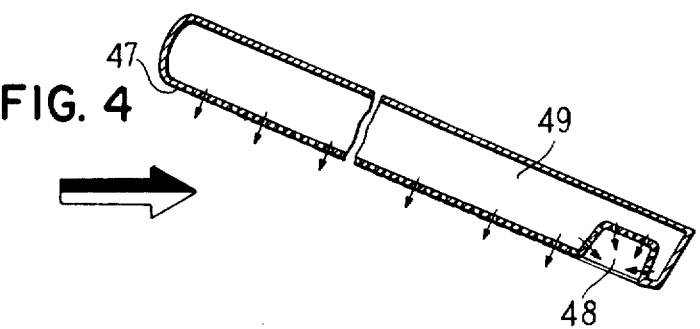
FIG. 4 is a view similar to FIG. 2, but showing a further alternative embodiment.

As shown in FIG. 4, both the deflecting plate 47 as well as the collector groove 48 are advantageously provided with coherent sieve surfaces with individual apertures in the sieve having a circular or a rectangularly formed configuration and directly associated with a pressure chamber 49 located, essentially, behind same. Through such a construction of deflecting plate, according to this invention, not only is a form of gas turbulence developable and maintained upright on the outer surface of the deflecting plate 47, such gas turbulence moving in the direction of gas, but also through such gas turbulence, the channel 14 is protected from formations of deposited particles on surfaces thereof and the discharge of solids from channel 48 is effectively supported.

Apparatus according to the present invention is not limited to the embodiments shown and described by way of example in the drawings. Thus, for example, the deflecting plates employed in the practice of this invention may also very advantageously be provided with slot-shaped openings extending in a vertical direction. Or, solely, the deflecting plates or solely the collector grooves may be provided wholly or partially with openings. Beyond this, also the collector grooves may be constructed as desired with respect to their shape, aperture characteristics, and the like.

While preferred embodiments of the invention have been disclosed, it will be appreciated that these have been shown by way of example only, and the invention is not to be limited thereto as other variations will be apparent to those skilled in the art and the invention is to be given its fullest possible interpretation within the terms of the following claims.

I claim as my invention:

1. Apparatus for the separation of solid particles from a stream of gas comprising:

A. a housing having defined therein a chamber and having a gas input port defined in one end region thereof and a gas output port defined in an opposed end region thereof for passage of a gas stream longitudinally through said chamber, B. a plurality of spaced, parallel deflecting plates located in said chamber so as to extend generally diagonally across said chamber transversely relative to the direction of flow of a said gas stream therethrough, the front face of each said deflecting plates being inclined to said gas input port and to said direction of flow, C. wall members connected with each said deflecting plate to define a relatively shallow cavity over and about the rear face of each said deflecting plate said wall members further being connected with each said deflecting plate to define a transversely extending channel along the terminal edge portion of each deflecting plate relative to said direction of flow, the mouth of each channel being in generally parallel relationship to its adjacent said deflecting plate, D. each said deflecting plate having a plurality of small gas flow apertures extending therethrough, E. gas pressurizing means, gas pressure regulating means, and first conduit means interconnecting said gas pressurizing means and said gas pressure regulating means with each one of said cavities, and F. particle collection means and second conduit means interconnecting said particle collection means with an end region of each one of said channels.

2. The apparatus of claim 1 wherein said apertures have a slot-like configuration.

3. The apparatus of claim 1 wherein said apertures have a circular configuration.

4. The apparatus of claim 1 wherein said apertures having a sieve-like configuration.

* * * * *